United States Patent [19]

Shuey

[11] Patent Number: 4,686,382
[45] Date of Patent: Aug. 11, 1987

[54] SWITCH BYPASS CIRCUIT FOR POWER LINE COMMUNICATION SYSTEMS

[75] Inventor: Kenneth C. Shuey, Raleigh, N.C.

[73] Assignee: Westinghouse Electric Corp., Pittsburgh, Pa.

[21] Appl. No.: 765,470

[22] Filed: Aug. 14, 1985

[51] Int. Cl.⁴ .............................................. H04B 3/56
[52] U.S. Cl. ................................ 307/149; 340/310 R
[58] Field of Search ....................... 307/17, 30, 38, 96, 307/149; 333/126, 129, 131, 132, 134, 176, 177; 361/13, 81; 340/310 R, 310 A

[56] References Cited

U.S. PATENT DOCUMENTS

| | | | |
|---|---|---|---|
| 3,895,370 | 7/1975 | Valentini | 340/310 A |
| 3,909,821 | 9/1975 | Jagoda et al. | 340/310 R |
| 4,065,763 | 12/1977 | Whyte et al. | 307/149 X |
| 4,078,216 | 3/1978 | Kamber | 333/176 |
| 4,319,224 | 3/1982 | Tappeiner et al. | 340/310 R |
| 4,473,816 | 9/1984 | Perkins | 340/310 R |
| 4,528,611 | 7/1985 | Udren | 361/81 |

Primary Examiner—William M. Shoop, Jr.
Assistant Examiner—Sharon D. Logan
Attorney, Agent, or Firm—G. H. Telfer

[57] ABSTRACT

A signal bypass apparatus for a power line distribution switch incorporates two portions that are electrically connected together in parallel with a power line switch. Each portion comprises a transformer that is connected electrically in parallel with an inductor. A capacitor is connected between the transformer and the inductor of each portion and the assembly is connected between one side of a power line distribution switch and ground. The other portion of the bypass apparatus is similarly configured and connected between the other side of the power line distribution switch and ground. In one embodiment, the bypass apparatus is electrically connected to a transceiver.

4 Claims, 2 Drawing Figures

SWITCH BYPASS CIRCUIT FOR POWER LINE COMMUNICATION SYSTEMS

BACKGROUND AND SUMMARY OF THE INVENTION

The present invention relates generally to power line communication systems and, more particularly, to a circuit that permits communication signals to bypass an open switch in a power distribution circuit while preventing the passage of potentially lethal 60 Hz line current around the open switch.

Electric utility companies utilize power line communication systems to communicate between a central station and remote devices, such as electric meters and load management terminals that are equipped with receivers or transceivers. In a system of this type, a central station is generally configured to transmit signals on the power line distribution system to communicate with a plurality of remote stations. The remote stations can be electric meters or load management terminals that are located at consumers' residences. The load management terminals are typically configured to shed interruptible electric loads, on command from the central station, during periods of peak demand. The signals emanating from the central station can be load shed commands or requests for electrical energy consumption data. In the latter case, the central station transmits a command that instructs a particular remote terminal to provide its consumption data by return transmission. The remote stations can be either one-way or two-way devices wherein the one-way devices are capable of following command instructions, such as load shed commands, and the two-way devices are capable of transmitting messages to the central station in response to received commands.

Although many different types of communication techniques are possible for use with a power line communication system, one known technique emloys a high frequency signal which is modulated by a baseband data signal containing a coded message. A high frequency signal can be, for example, 12.5 kHz and may be modulated by the baseband data signal in a coherent phase shift keyed (CPSK) system. The modulated signals are demodulated by the receiving stations. U.S. Pat. No. 4,311,964, which issued to Boykin on Jan. 19, 1982, describes a coherent phase shift keyed demodulator that is usable in a power line communication system. U.S. Pat. No. 4,379,284, which issued to Boykin on Apr. 5, 1983, discloses another coherent phase shift keyed demodulator. Load management terminals (LMT's) that can be used in such a power line communication system are disclosed in U.S. Pat. No. 4,402,059, which issued to Kennon et al. on Aug. 30, 1983, and U.S. Pat. No. 4,130,874, which issued to Pai on Dec. 19, 1978.

U.S. Pat. No. 4,250,489, which issued to Dudash et al. on Feb. 10, 1981, discloses a distribution network communication system having branched connected repeaters and U.S. Pat. No. 4,427,968, which issued to York on Jan. 24, 1984, discloses a distribution network communication system with flexible message routes. When messages must travel a significant distance on the power line, it is a known technique to utilize a repeater that is capable of receiving a transmitted message and retransmitting that message in order to provide a stronger signal for receipt by remote receivers. When the remote receivers are located at significant distances from the central station, one or more repeaters is used to assure that transmitted signals are not attenuated beyond the capability of the receivers. U.S. Pat. No. 4,032,911, which issued to Melvin on June 28, 1977, discloses a signal repeater for power distribution line communication systems.

Electric utility companies employ switches in the power line distribution network that permit portions of the network to be disconnected when a fault is detected within that portion. For example, if part of a power line is damaged due to an electrical storm, ice damage or damage to an electric utility pole, appropriate switches are open to disconnect that portion of the power line distribution system from the main network to facilitate repair. When this type of power line distribution switch is opened, the power line communication system which utilizes the power line would normally experience a discontinuity that prevents signals from being transmitted to or received from remote devices in that portion of the power line distribution network. When the power line distribution switch is opened, power is not necessarily removed from one side of the switch. Although, under certain circumstances, an open power line distribution switch will result in the deprivation of power from one side of the switch, this situation may not arise if that side of the switch is provided power from another source in the power distribution network. Even though that portion of the power line distribution network can be deprived of electrical power during periods when the switch is open, the remote devices could otherwise receive and transmit messages if they are provided with a battery backup system. However, the discontinuity in the power line that is caused by the open switch would normally prevent communications between the remote terminals and the central station by depriving the remote devices of a signal transmission path to the central station.

The present invention provides a means for communicating signals around open switches of a power line distribution network. It permits high frequency signals, such as the 12.5 kHz coherent phase shift keyed signals described above, to bypass the open switch while preventing lower frequency current, such as the 60 Hz power distribution frequency, from passing around the open switch. The prevention of the 60 Hz line current is critical since it would otherwise be dangerous if this power distribution current is allowed to bypass the open switch. The bypass of the 60 Hz current around the open switch would defeat its essential purpose of disconnecting the affected portion of the network from the main power source during repair procedures.

The present invention comprises two basic portions. Each portion is provided with a transformer that has a primary and a secondary winding. An inductor is connected electrically in parallel with the primary winding of the transformer and a first terminus, or termination, of the primary winding of the transformer is connected to ground. A capacitor is connected electrically in series between a second terminus of the primary winding of the transformer and the inductor. One side of the power line circuit is connected electrically to the capacitor, between the capacitor and the inductor. Another similarly configured apparatus comprises a transformer, an inductor and a capacitor connected in the manner described above. The capacitor of this second portion of the present invention is connected to the opposite side of the switch and the secondary windings of these two transformers are connected together. This configuration permits high frequency communication signals to pass from one side of the open switch to the other while blocking lower frequency currents, such as the 60 Hz line current. The present invention also permits a transceiver to be connected electrically to the secondary windings of the two transformers to receive power line communication signals and retransmit those signals following amplification. This type of transceiver would operate as a repeater.

The present invention blocks 60 Hz line current from passing around an open switch in a power distribution network while permitting high frequency power line communication signals, such as a 12.5 kHz signal, to bypass the switch. It permits remote receivers, that would otherwise be disconnected by an open power line distribution switch, to receive signals from a central station and transmit signals to that central station even though an open power distribution switch exists in the power line between the central station and the remote terminals.

BRIEF DESCRIPTION OF THE DRAWING

The present invention will be more fully understood from a reading of the Description of the Preferred Embodiment in conjunction with the drawing, in which.

DESCRIPTION OF THE PREFERRED EMBODIMENT

Figure 1:
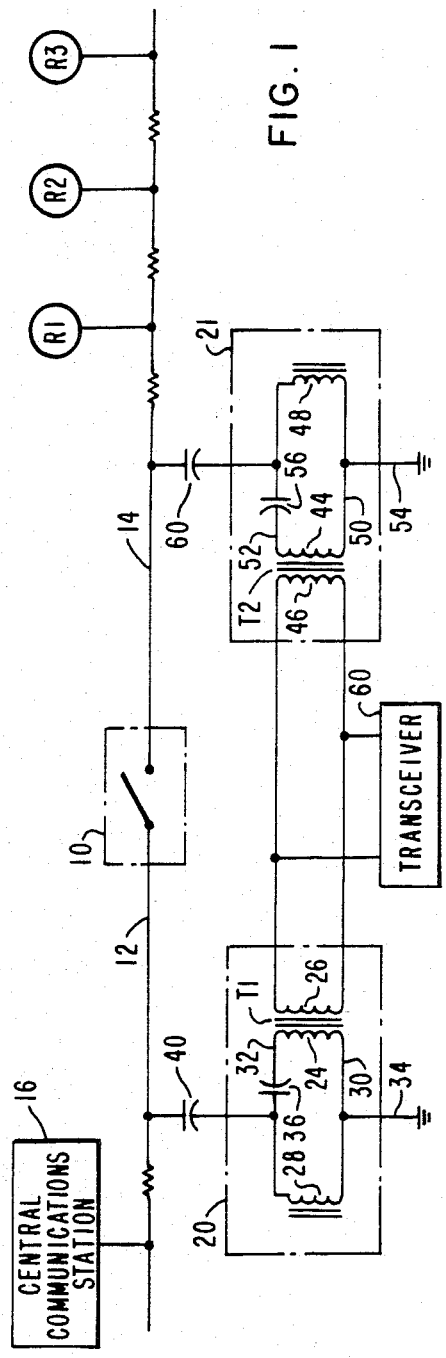
FIG. 1 illustrates the present invention connected in parallel with a switch of a power line distribution system.

FIG. 1 illustrates the present invention connected in parallel with a switch 10 of a power line distribution system. A first portion 12 of the power line is connected to a power source, such as a generating station. A second portion 14 of the power line is connected to a plurality of electrical loads, such as electrical consumers' residences. FIG. 1 illustrates a number of receivers, R1, R2 and R3, that are located at consumers' residences and are capable of receiving power line communication signals from a transmitter 16 that is located at a central station. It should be understood that these receivers can also have two-way communication capabilities.

The switch 10 is disposed electrically between the transmitter 16 and the receivers, R1, R2 and R3. If an electrical fault occurs in the second portion 14 of the power line distribution system, the switch 10 is opened to isolate that portion 14 of the power line from the power source. However, as can be seen in FIG. 1, an open switch 10 also disconnects the receivers from the transmitter 16. If no means is provided for bypassing the open switch 10, the receivers are incapable of receiving signals from the transmitter 16 or transmitting signals to the central communication station 16. The present invention provides a bypass that permits high frequency signals, such as 12.5 kHz signals, to pass from the first portion 12 to the second portion 14 of the power line distribution system.

The present invention comprises two similar portions. A first portion 20 is connected to a first side of the switch 10 and a second portion 21 is connected to a second side of the switch 10. The first portion 20 of the present invention comprises a first transfomer T1 that has a primary winding 24 and a secondary winding 26. It also comprises an inductor 28 that is connected in parallel with the primary winding 24 of the first transformer T1. The primary winding 24 of the first transformer T1 has two termini, or terminations. The first terminus 30 of the primary winding 24 is connected to ground 34 and the second terminus 32 of the primary winding 24 is connected to a first capacitor 36. This first capacitor 36 is electrically connectable, at a point between the first capacitor 36 and the inductor 28, to one side of the switch 10. As shown in FIG. 1, a coupling capacitor 40 is used to couple the first portion 20 of the present invention to one side of the switch 10.

A second portion 21 of the present invention comprises a second transformer T2 having a primary winding 44 and a secondary winding 46. The second transformer T2 is connected electrically in parallel with a second inductor 48. The second transformer T2 has two termini, or terminations. A first terminus 50 is connected to ground 54 and a second terminus 52 is connected to a second capacitor 56. The second capacitor 56 is electrically connectable to a second side of the switch 10. As illustrated in FIG. 1, a coupling capacitor 60 is used to couple the second portion 21 of the present invention to the second side of the switch 10. The two portions, 20 and 21, of the present invention, are electrically connected together as shown in FIG. 1 with the secondary winding 26 of the first transformer T1 connected electrically in parallel with the secondary winding 46 of the second transformer T2.

It should be understood that, in the event that switch 10 is open, the first portion 12 of the power line would typically be at a potential of approximately 20,000 volts or more while the second portion 14 of the power line could essentially be at a zero potential. The present invention prevents the 60 Hz power line distribution current from passing through it. The combination of the inductors, 28 and 48, the first and second transformers, T1 and T2, and the first and second capacitors, 36 and 56, provide significant filtering which effectively prevents any 60 Hz current from passing around the open switch 10. However, a high frequency current, such as the 12.5 kHz signal used in typical power line communication systems, will pass freely through the first 20 and second 21 portions of the present invention. Therefore, signals can be transmitted between the central communication station 16 and the remote receivers, R1, R2 and R3, even though the switch 10 is open.

Both the first 20 and second 21 portions of the present invention operate as signal coupling units (SCU's). A typical SCU filter comprises a capacitor, 40 or 60, and an inductor, 28 or 48, that forms a two-pole high-pass network with a 3 dB frequency of approximately 1500 Hz. The series capacitor, 36 or 56, works with the transformer, 24 or 44, to further reduce low frequency waveforms while enhancing high frequency signals. Therefore, the present invention utilizes available components in a manner that effectively prevents power distribution frequencies from passing around a power distribution switch 10 while permitting high frequency signals to be transmitted between first and second portions, 12 and 14, of a power line.

Also shown in FIG. 1 is a transceiver 60 that can be connected electrically between the first 20 and second 21 portions of the present invention. The transceiver 60, which can be a repeater, is connected to the secondary winding 26 of the first transformer T1 and the secondary winding 46 of the second transformer T2. Although the existence of a transceiver 60 is not a requirement of the present invention, FIG. 1 illustrates how it can be electrically connected in conjunction with the present invention to provide effective coupling between the transceiver 60 and the power line. The transceiver 60, if connected as shown in FIG. 1, could receive signals from the central communication station 16 and retransmit those signals, after amplification, to the remote receivers, R1, R2 and R3 or, conversely, receive signals from the remote devices and retransmit those signals to the central communication station 16.

Figure 2:
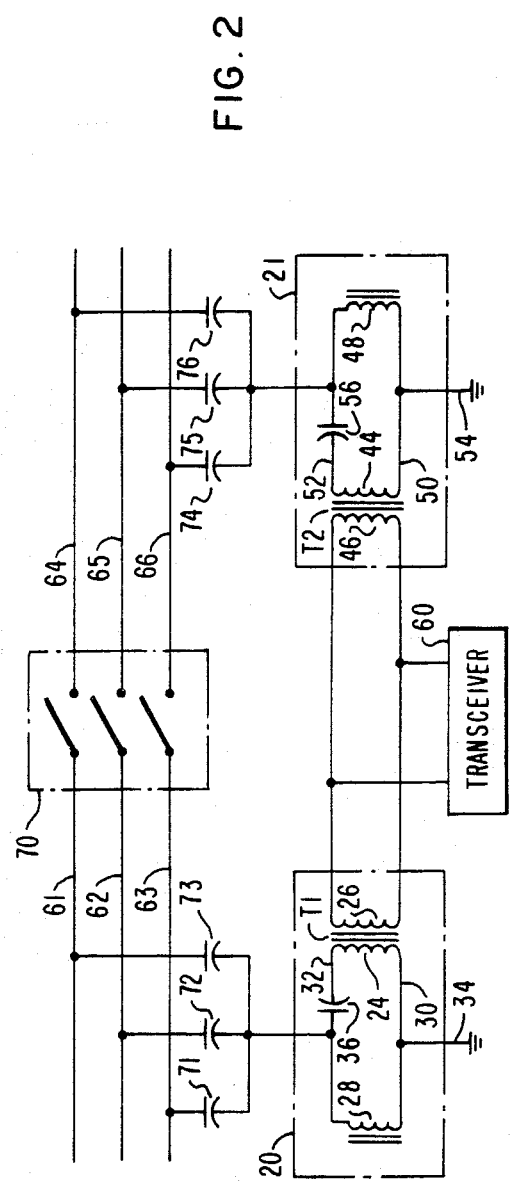
FIG. 2 illustrates the present invention connected in association with a three phase power distribution system.

Although FIG. 1 illustrates the present invention connected to a single power line and a single switch 10, it should be understood that it can also be effectively utilized in a three phase power distribution system. FIG. 2 illustrates the present invention connected to a three phase power distribution system. Between first portions, 61, 62 and 63, of a three phase power distribution system and second portions, 64, 65 and 66, of a power distribution system, a three phase switch 70 is connected to provide a means for disconnecting a portion of the power distribution network from the central power station. As described above in conjunction with FIG. 1, the present invention comprises a first portion 20 and a second portion 21. The first portion 20 of the present invention is coupled to the first side of the switch 70 by coupling capacitors, 71, 72 and 73, and the second portion 21 of the present invention is coupled to the second side of switch 70 by coupling capacitors 74, 75 and 76 as shown in FIG. 2. The internal components of the first 20 and second 21 portions of the present invention are identical to those illustrated in FIG. 1. Also shown in FIG. 2 is a transceiver 60 connected electrically between the first portion 20 and the second portion 21 of the present invention.

Comparing FIGS. 1 and 2, it should be apparent that the only difference between the utilization of the present invention with a single power line and a three phase power line is the use of multiple coupling capacitors (e.g. reference numerals 71, 72, 73, 74, 75 and 76) to couple the present invention to a three phase power distribution line.

Although it should be apparent that the first and second portions of the present invention can be configured in many alternative forms, a preferred embodiment of the present invention utilizes first and second transformers, T1 and T2, that have tapped windings and first and second inductors, 28 and 48, which have values of approximately 7 millihenries. The first and second capacitors, 36 and 56, are 1 microfarad 400 volt capacitors in a preferred embodiment of the present invention and the coupling capacitors, 40 and 60, are 0.64 microfarad 20,000 volt capacitors. The inductors, 28 and 48, have an inductance of 7 mH in a preferred embodiment of the present invention.

The present invention provides a means for bypassing open switches in a power line distribution system for purposes of transmitting high frequency power line communication signals between transmitters and receivers that are operatively coupled to the power line and separated by the open switch. Although the present invention has been described with considerable specificity in conjunction with the preferred embodiment of the present invention, it should be understood that other alternative embodiments are within its scope.

What I claim is:

1. Apparatus for coupling a power line communication signal around a switch, comprising:
    a first transformer having a primary winding and a secondary winding;
    a first inductor connected electrically in parallel with said primary winding of said first transformer, a first terminus of said primary winding of said first transformer being connected to ground;
    a first capacitor being connected electrically in series between a second terminus of said primary winding of said first transformer and said first inductor, a first side of a power line switch being electrically connectable to said first capacitor between said first capacitor and said first inductor;
    a second transformer having a primary winding and a secondary winding;
    a second inductor connected electrically in parallel with said primary winding of said second transformer, a first terminus of said primary winding of said second transformer being connected to ground;
    a second capacitor being connected electrically in series between a second terminus of said primary winding of said transformer and said second inductor, a second side of a power line switch being electrically connectable to said second capacitor between said second capacitor and said second inductor;
    a first terminus of said secondary winding of said first transformer being connected in electrical communication with a first terminus of said secondary winding of said second transformer; and
    a second terminus of said secondary winding of said first transformer being connected in electrical communication with a second terminus of said secondary winding of said second transformer;
    a transceiver connected in electrical communication with said first terminus and said second terminus of said secondary winding of said first transformer.

2. The apparatus of claim 1, wherein:
    said secondary winding of said first transformer has three or more termini.

3. The apparatus of claim 1, wherein: said secondary winding of said second transformer has three or more termini.

4. A coupling device for bypassing a switch in a power line distribution circuit, comprising:
    a first transformer having a primary winding and a secondary winding;
    a first inductor connected electrically in parallel with said primary winding of said first transformer, a first termination of said primary winding of said first transformer being connected to ground;
    a first capacitor being connected electrically in series between a second termination of said primary winding of said first transformer and said first inductor, a first side of a power line switch being electrically connectable to said first capacitor between said first capacitor and said first inductor;
    a second transformer having a primary winding and a secondary winding;
    a second inductor connected electrically in parallel with said primary winding of said second transformer, a first termination of said primary winding of said second transformer being connected to ground;
    a second capacitor being connected electrically in series between a second termination of said primary winding of said transformer and said second inductor, a second side of a power line switch being electrically connectable to said second capacitor between said second capacitor and said second inductor;

a first termination of said secondary winding of said first transformer being connected in electrical communication with a first termination of said secondary winding of said second transformer;

a second termination of said secondary winding of said first transformer being connected in electrical communication with a second termination of said secondary winding of said second transformer; and a transceiver electrically connected to said first termination of said secondary winding of said first transformer and to said second transformer of said secondary winding of said first transformer.

* * * * *